United States Patent [19]
Busweiler

[11] 3,897,218
[45] July 29, 1975

[54] POLYCONDENSATION REACTOR

[75] Inventor: Walter Busweiler, Bischofsheim, Germany

[73] Assignee: Metallgesellschaft Aktiengesellschaft, Frankfurt am Main, Germany

[22] Filed: Jan. 15, 1974

[21] Appl. No.: 433,606

[30] Foreign Application Priority Data
Feb. 23, 1973  Germany............................ 2309027

[52] U.S. Cl. ........................ 23/285; 55/52; 55/199; 159/6 WH; 159/11 R; 259/9; 259/10; 259/45; 259/46; 259/109; 259/110; 260/75 M
[51] Int. Cl. ........................ B01d 19/00; C08g 35/00
[58] Field of Search .......... 23/285; 55/52; 159/6 W, 159/6 H, 11 R; 259/9, 10, 45, 46, 109, 110

[56] References Cited
UNITED STATES PATENTS

| | | |
|---|---|---|
| 3,358,422 | 12/1967 | Van Der Schee................ 23/285 X |
| 3,476,521 | 11/1969 | Wise..................................... 23/285 |
| 3,476,523 | 11/1969 | Leybourne............................ 23/285 |
| 3,634,042 | 1/1972 | McCown............................... 23/285 |

*Primary Examiner*—James H. Tayman, Jr.
*Attorney, Agent, or Firm*—Burgess, Dinklage & Sprung

[57] ABSTRACT

A shell adapted to be heated and at least one inlet and outlet for feed and product, respectively, a rotatable inner member which is at least partly immersed in the material being reacted. The inner member includes a plurality of successive rotary drums each having an apertured shell and mounted on a common, approximately horizontal shaft in such a manner so as to leave a gap between adjacent drums. Partitions are detachably secured to the bottom of the reactor shell and extend into the gaps between adjacent drums, said partitions decreasing in height toward the outlet.

6 Claims, 8 Drawing Figures

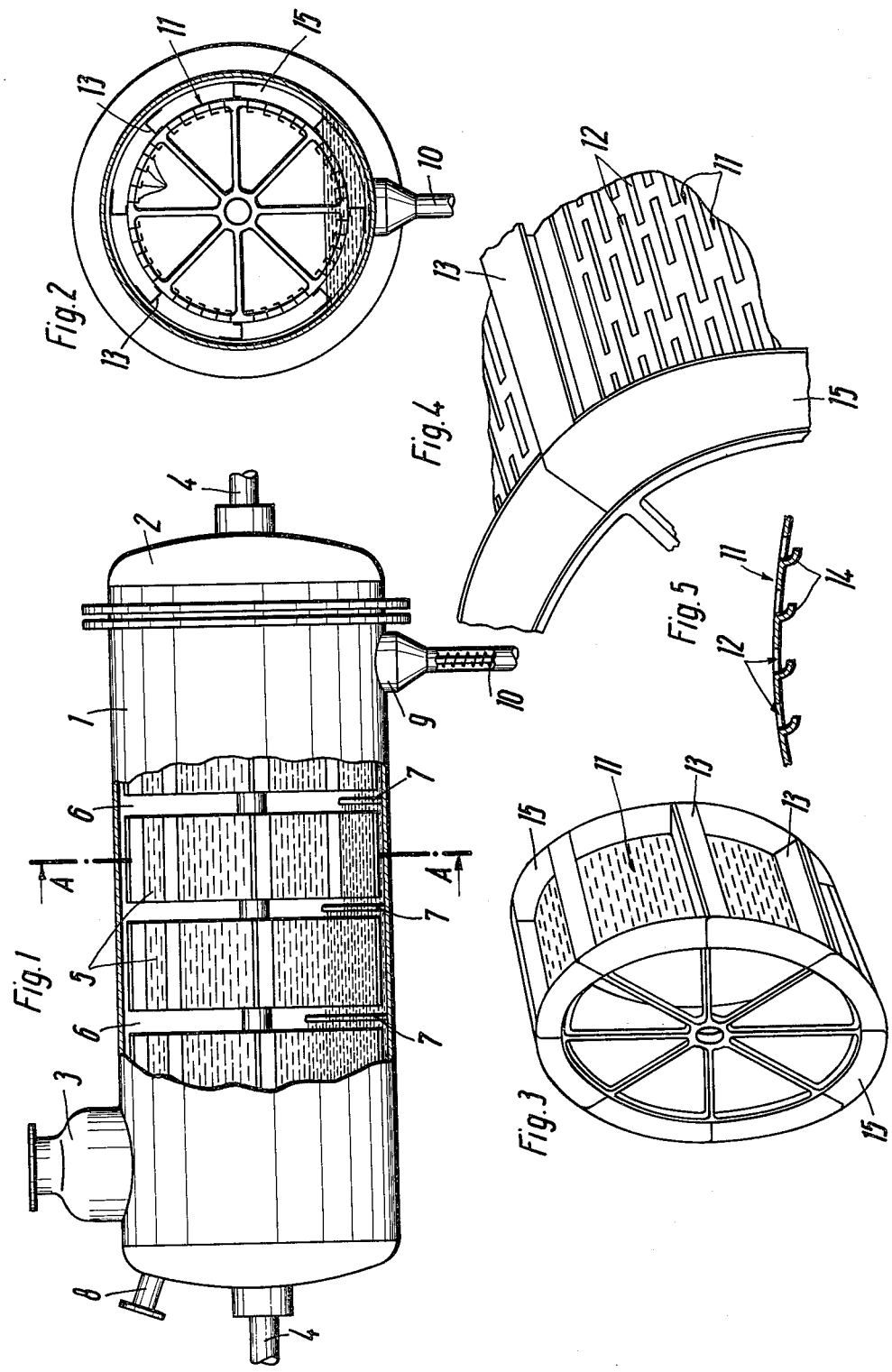

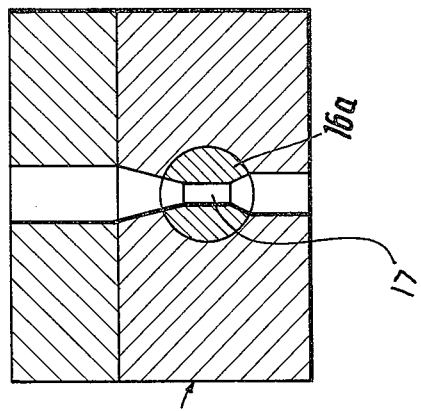
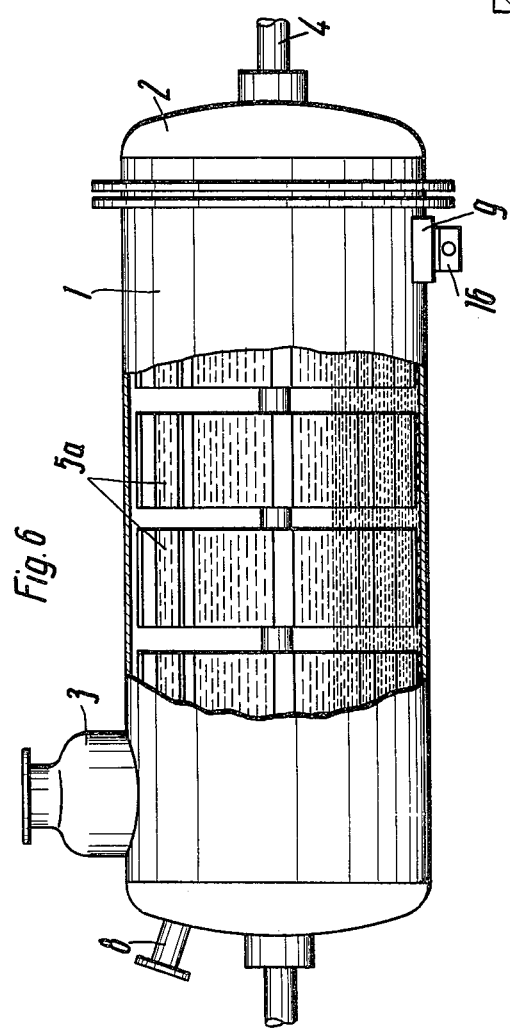
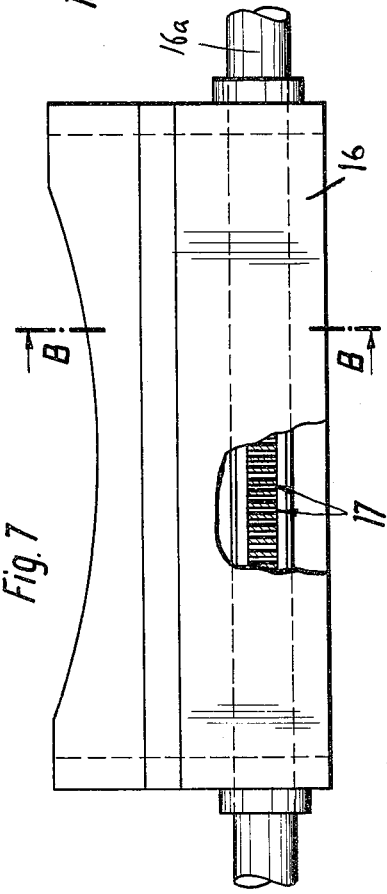

POLYCONDENSATION REACTOR

BACKGROUND

This invention relates to a polycondensation reactor for selective use in continuous or batchwise operation, comprising a heatable shell having at least one inlet and outlet for the feed and product, respectively, and a rotatable inner part, which is at least partly immersed into the material, being reacted.

Reactors of this kind are used for polycondensation. By way of example, reference is made to the condensation of terephthalic acid with glycol, usually in a plurality of stages, to form polyglycoterephthalate. The most important stage of this polycondensation is the end stage, in which the reaction is completed. The final polycondensation is carried out in most cases in heated cylindrical reactors having a rotatable inner part.

Known reactors of this kind have been described, e.g., in Opened German Pat. Application No. 1,745,532 and Opened German Pat. Application No. 1,570,939. These relate to reactors for continuous operation and use rotary stirrers to accelerate the condensation reaction.

SUMMARY

It is an object of the invention to improve the art by a rotatable inner part of the reactor designed to stir and also to form adhering and freely falling films. In this manner, a polycondensate of best quality is produced because the reaction process can take place very fast and the product in the reactor is not exposed to the reaction temperatures for an excessively long time. Such prolonged exposure could induce reactions which oppose the condensation. Besides, the polycondensation reactor according to the invention should be selectively usable for continuous or batchwise operation and the change between the modes of operation should involve a minimum of alterations of the reactor.

The objects underlying the invention are accomplished in that the inner part consists of a plurality of successive rotary drums having an apertured shell and mounted on a common, approximately horizontal shaft so as to leave a gap between adjacent drums and that partitions are detachably secured to the reactor bottom and extend into these gaps and decrease in height toward the outlet for the reacted material. The partitions are required when the polycondensation reactor is used in continuous operation and are removed when the reactor is altered for batchwise operation.

DESCRIPTION OF THE DRAWING

Embodiments of the reactor according to the invention will be explained hereinafter by way of example with reference to the drawing, in which FIG. 1 is a side elevation view partly cut away showing a polycondensation reactor for continuous operation;

FIG. 2 is a cross sectional view taken along line A—A of FIG. 1,

FIG. 3 is a perspective view showing a single rotary drum,

FIG. 4 is a partial perspective view of the surface of a rotary drum,

FIG. 5 is an enlarged cross sectional view taken along line A—A of FIG. 1 through a portion of the shell of a rotary drum, FIG. 6 is a side view in elevation similar to FIG. 1 showing the reactor for batchwise operation;

FIG. 7 is an enlarged elevation view partly broken away showing a rotary valve; and FIG. 8 an enlarged cross sectional view taken along line B—B of FIG. 7.

DESCRIPTION

For the use of the reactor in continuous operation, a discharge screw is provided at the outlet. When the reactor is used for batch operation, this screw is replaced by a rotary valve, which serves also as a die. The rotary valve member is preferably provided with a plurality of parallel flow passage bores so that there is only a low pressure loss when the polycondensate is extruded under nitrogen pressure. When the rotary valve is closed, it provides a vacuum tight seal and protects the die orifices so that the polycondensate in the reactor cannot oxidize.

According to a further feature of the invention, the shells of the rotary drums are provided with distributing tongues, which protrude into the drum, and with outwardly extending scoops. From the manufacturing aspect it will be desirable to provide the rotary drums with distributing tongues which have been struck out from the shell of the drum and angled inwardly. Such rotary drums when rotated effect an intense stirring of the contents of the reactor, mainly by the scoops having a very high drag. At the same time, these scoops entrain material which is to be condensed and pour out said material over the shell of the drum as the latter continues to rotate. This results in the formation of liquid films and droplets, which have a large surface and either adhere to the shell of the drum of fall through its apertures. These large surfaces greatly contribute to a fast evaporation of the volatile products formed by the reaction so that they can rapidly be withdrawn and the reaction rate can be considerably increased.

The polycondensation reactor shown in FIG. 1 has a heatable cylindrical body 1 and a removable cover 2. A suction pipe 3 is connected to the body 1 and in operation is connected to a pump by means which are not shown. A shaft 4 extends axially through the reactor and is rotated by a motor which is not shown. Inside the reactor, the shaft 4 carries a plurality of rotary drums 5, details of which are shown more clearly in FIGs. 2 to 5.

A gap 6 is left between adjacent rotary drums 5. A weirlike partition 7 extends from the bottom of the body 1 into each gap. The partitions differ in height. The partition nearest to the feed inlet 7 is largest in height and the partitions decrease in height toward the product outlet 9. This results in a cascadelike flow of the material toward the outlet.

The liquid mixture to be reacted in the reactor is continuously fed through the inlet 8 while the body 1 is maintained at a predetermined, elevated temperature. By the rotation of the drums 5, the mixture to be polycondensated, which is retained behind each partition 7, is mixed through, and part of it is carried around by the drums. As a result, the vapors formed by the reaction can particularly easily and rapidly escape so that the reaction is greatly accelerated. Any vapors formed are sucked off through pipe 3 so that a reduced pressure similar to a vacuum is maintained in the reactor.

The mixture in the reactor is retained for some time behind each of the weirlike walls 7 and during this time is mixed with the material which has been there before and is subjected to a continuously proceeding polycondensation reaction. Subsequently fed mixture causes the material in the reactor to approach the outlet 9 while its viscosity increases as polycondensate is formed. The product at the outlet 9 is completely condensed and is withdrawn by a discharge screw 10.

The partitions 7 and the rotary drums 5 cooperate so that the material continuously flowing through the rector remains for an almost equal residence and reaction time behind each wall and a uniformly condensed product can finally be discharged by the screw 10. This is due to the good stirring action of the rotary drums and to the special shape thereof, which causes the drums to finely divide the material carried upwardly by the drums from the sump so as to provide large surfaces.

For this purpose, the rotary drums 5 have an apertured shell 11 formed with slots 12 and scoops 13, as is apparent most clearly from FIGS. 2 to 4. The openings 12 are formed by punching so that respective distributing tongues 14 are provided, which extend from the edges of the slots and protrude inwardly toward the shaft 4. The tongues 14 are angled inwardly, as is apparent from FIG. 5.

The scoops 13 are formed by angled metal plates and are mechanically stiffened by flat rings 15, which are secured to the edges of the drum and close the ends of the scoops.

In operation the drums 5 rotate through the material which is retained behind the partitions 7 so that the scoops 13 are filled, as is best apparent from FIG. 2. As the rotation of the drums 5 is continued, the scoops carry the received material upwardly and then pour it over the shell of the drum. The poured material is distributed into the slots 12 and finally flows off over the tongues 14 and falls back into the sump. The scooping up of the material and its running down in divided form results in the formation of adhering films and of films falling freely from the tongues in a very fine division so that they have a large surface and vaporous reaction products can be very rapidly removed from the material. Because each drum has also a strong stirring action as it moves through the sump, a uniformly condensed, high-grade product is formed in the reactor.

The slots 12 formed in the drum shells 11 of different drums 5 differ in size to allow for the different viscosities of the material being reacted. The drum which is nearest to the inlet 8 has the smallest openings and the openings then increase in size from drum to drum so that the drum disposed over the outlet 9 has the largest slots. The slots of the drum nearest to the inlet 8 have a width of about 2 millimeters and a length of about 60 millimeters. The openings in the other drums have the same length and larger width. An allowance for the fact that the viscosity of the material being reacted increases as the material is moving nearer to the outlet 9 can also be made in that the drum nearest to the inlet 8 has the largest number of scoops 13 and the number of scoops then decreases from drum to drum so that the drum over the outlet 9 has the smallest number of scoops.

FIG. 6 shows a reactor for batchwise operation. This reactor has been provided by an alteration of the reactor of FIG. 1. Like parts of both reactors are provided with like reference numbers. The main difference from the reactor of FIG. 1 resides in that the reactor of FIG. 6 has no partitions and that the product outlet 9 is provided with a rotary valve 16. The rotary drums 5a have basically the same design as the drums 5 of FIGS. 1 to 5. The only difference in the rotary drums 5a resides in that the slots 12 in the shells 11 of the several drums have the same size, e.g., 3 × 100 millimeters. This design is proper because in batchwise operation the viscosity of the material being reacted does not vary in the longitudinal direction of the reactor. During the operation of the reactor, the increase in viscosity of the contents is allowed for in that the speed of the drums is progressively reduced.

To change the reactor from a condition for continuous operation to one for batchwise operation or vice versa, the cover 2 is removed first and the drums 5 and then the partitions 7 are removed. Finally, the discharge screw 10 is replaced by the rotary valve 16. Because the successive drums 5 of the reactor for continuous operation have different slots, these drums cannot be used in the reactor for batchwise operation, in which fully indentical drums are required.

When the reactor of FIG. 6 is used for batchwise operation, the reaction mixture is charged through inlet 8 and reacts while the drums rotate so that the resulting vapors are sucked off through the pipe 3. When the polycondensation has been completed, the pumping to remove vapors is discontinued and nitrogen is fed into the reactor to a pressure of about 5 kilograms per square centimeter. This nitgrogen pressure serves to force the polycondensate through the open rotary valve.

The valve member of the rotary valve (see FIGS. 7 and 8) has a number of parallel bores 17, through which the polycondensate is extruded so that it can be subjected to further processing. The large number of bores 17 permits of a small pressure loss at the product outlet so that an advantageously low nitrogen pressure in the reactor is sufficient to extrude the polymer. In closed position, the rotary valve member 16a is rotated about its axis through 90° from the position shown in FIG. 8 and then provides a vacuum tight seal such as is required for the operation of the reactor.

What is claimed is:

1. Polycondensation reactor comprising shell means adapted to be heated and having at least one inlet and outlet for feed and product, respectively, rotatable inner means which is at least partly immersed into the material being reacted, said inner means including a plurality of successive rotary drum means each having an apertured shell provided with distribution tongues protruding into the drum, and with outwardly extending scoops, said rotary drums being mounted on a common, approximately horizontal shaft so as to leave a gap between adjacent drums, and partition means detachably secured to the bottom of the shell means and extending into the gaps between adjacent drums, said partition means decreasing in height toward said outlet.

2. Reactor of claim 1 wherein said outlet is positioned near one end of the reactor and has a rotary valve means.

3. Reactor of claim 2 wherein said rotary valve means has a plurality of parallel flow passage bores.

4. Reactor of claim 1 wherein the distribution tongues are struck out from the shell of the drum and angled inwardly.

5. Reactor of claim 1 wherein the apertures in the rotary drum means increase in size toward the outlet.

6. Reactor of claim 1 wherein the number of scoops on each rotary drum increases with the distance of the rotary drum means from the outlet.

* * * * *